Dec. 30, 1952   R. ADLER   2,623,943
FOLLOW-UP APPARATUS AND SYSTEM
Filed April 4, 1949   3 Sheets-Sheet 1
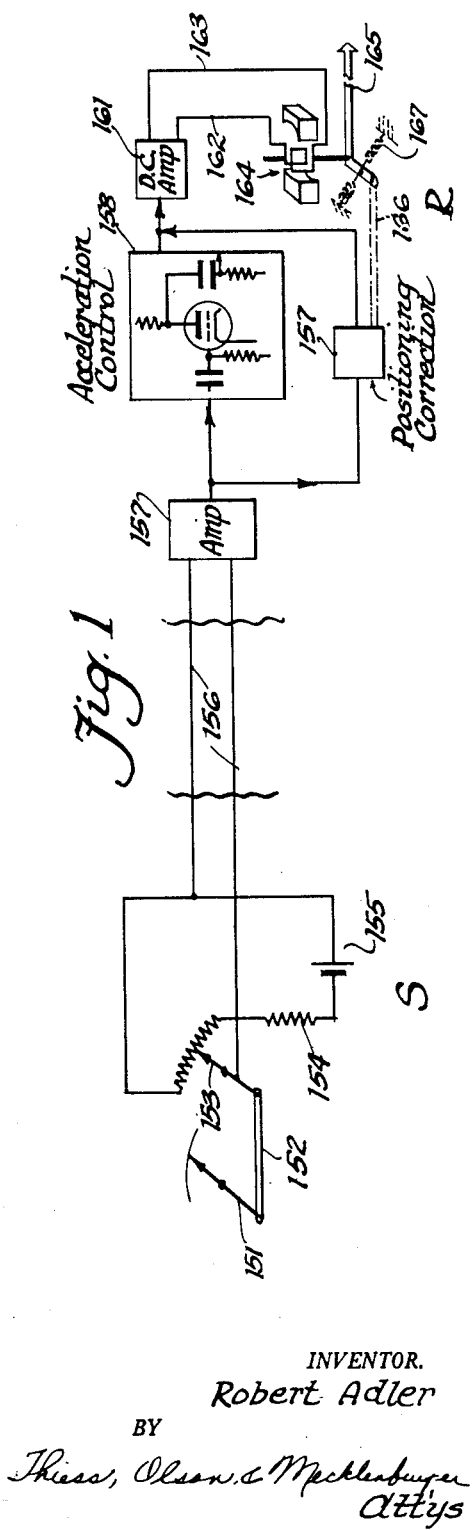
INVENTOR.
Robert Adler
BY
Thiess, Olson & Mecklenburger
Attys Dec. 30, 1952 — R. ADLER — 2,623,943
FOLLOW-UP APPARATUS AND SYSTEM
Filed April 4, 1949 — 3 Sheets-Sheet 2
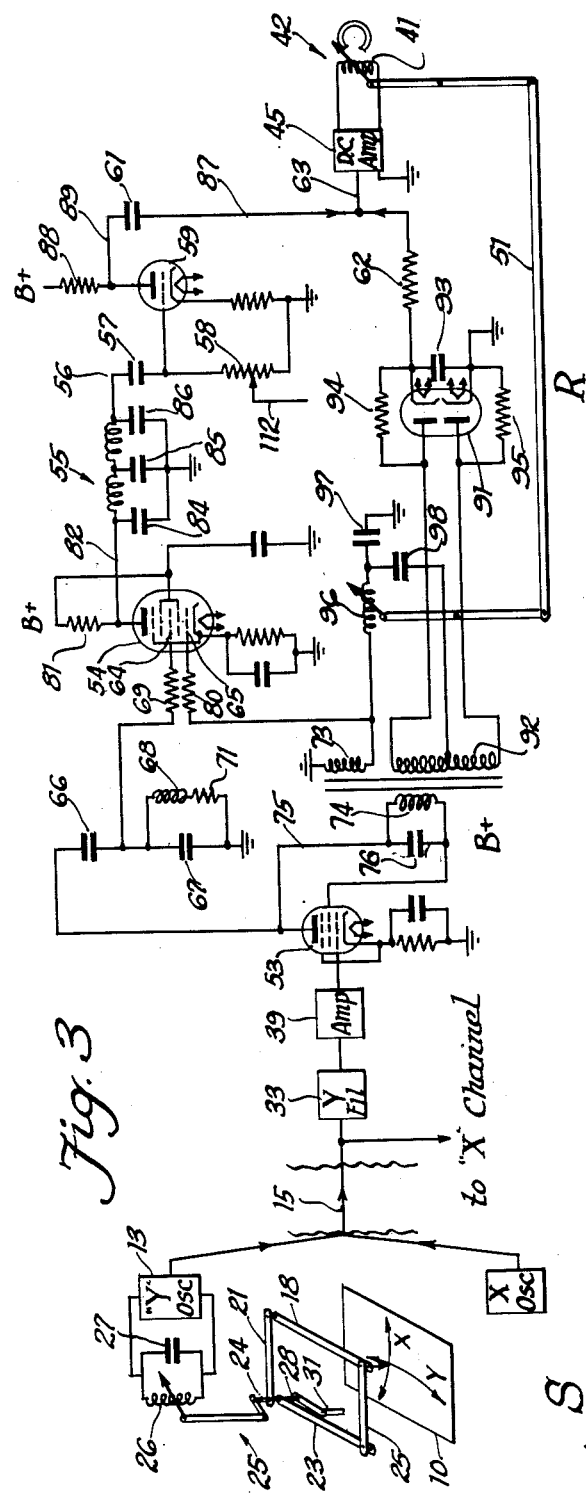
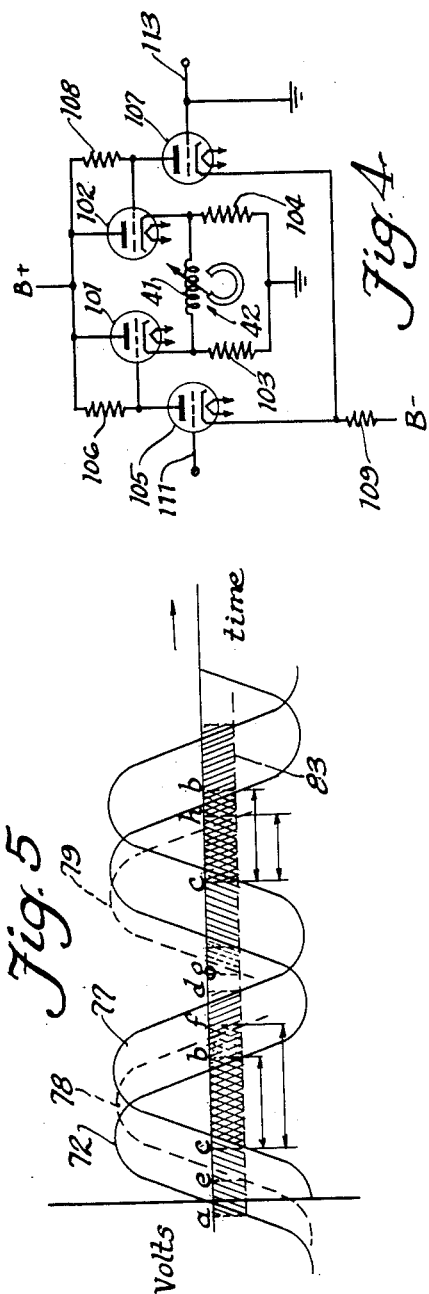
INVENTOR.
Robert Adler
BY
Thiess, Olson & Mecklenburger
Attys

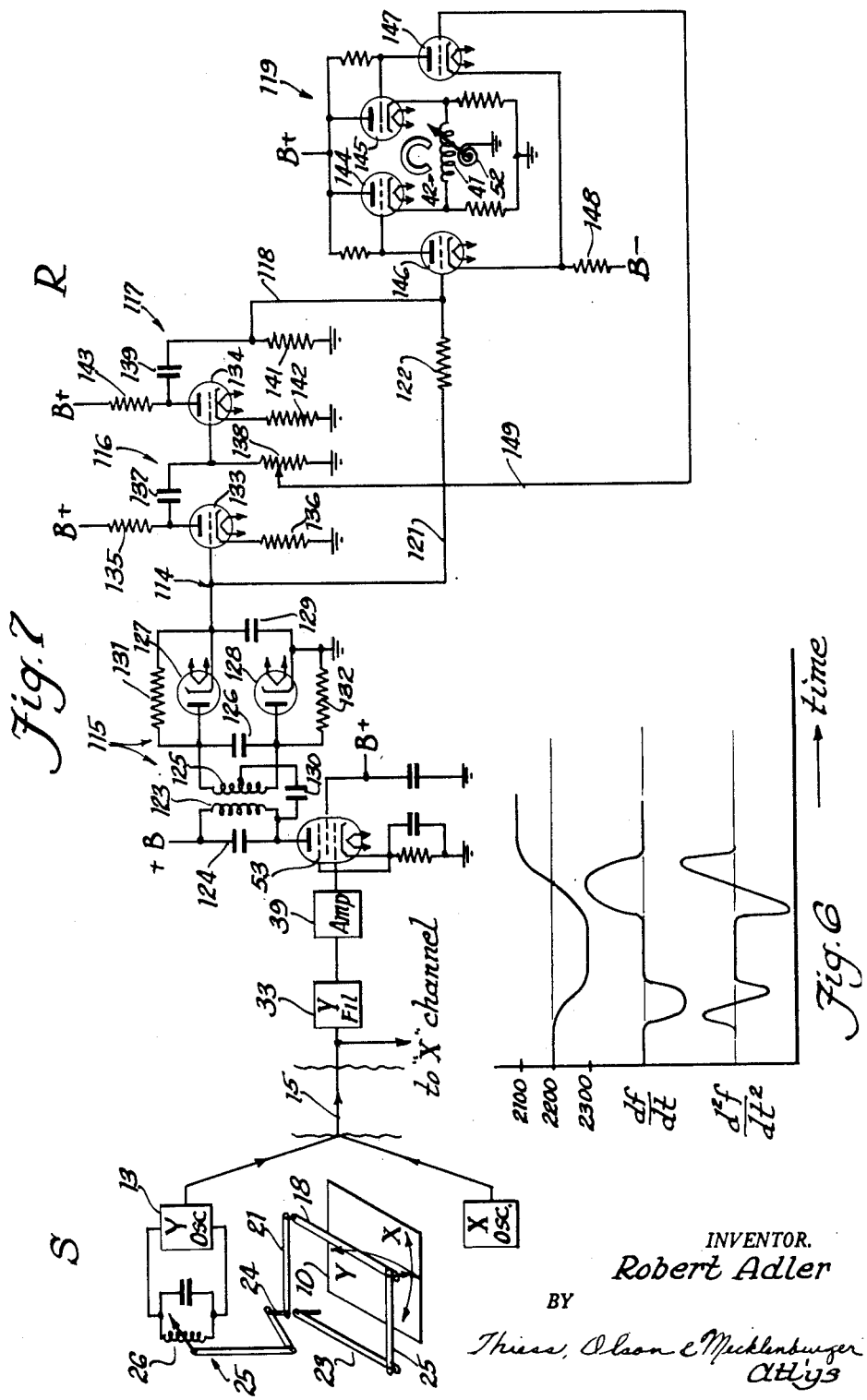

UNITED STATES PATENT OFFICE 2,623,943

FOLLOW-UP APPARATUS AND SYSTEM

Robert Adler, Chicago, Ill., assignor to Consolidated Electric Company, Chicago, Ill., a corporation of Illinois Application April 4, 1949, Serial No. 85,354

14 Claims. (Cl. 178—18)

This invention relates to follow-up systems and apparatus, more particularly to such apparatus and systems wherein a follow-up member at the receiver moves under the influence of forces produced in a linear electromagnetic driving unit which is energized directly from a linear amplifier, and it is an object of the invention to provide improved systems and apparatus of this character.

In follow-up apparatus generally, mechanical motions at a transmitting station cause the transmission of signals to a receiving station where mechanical motions corresponding to those at the transmitting station are produced, the motions at each station embodying desired intelligence. Well known follow-up apparatus includes a transmitting device capable of assuming different positions and a remotely placed similar receiving device capable of duplicating the position of the sending device.

In some forms of such well known apparatus, the motions of the transmitting device, while occurring slowly or rapidly, are continuous in character, and consequently the transmitting signal flowing therefrom and the motions of the receiving device are continuous in character. While structure embodying the principles of the invention have application to this form of well known apparatus, it has application as well to apparatus where a receiving member assumes varying positions in response to a signal which is a continuous function of time, as exemplified by instruments for recording electrical currents; the invention applies specifically to apparatus for recording transient phenomena.

In follow-up systems of any character, it is desirable that the motion of the receiving member assume the desired position within predetermined limits of error, which error may be considered as being of two types, static errors, and dynamic or transient errors.

Static errors are those due largely to the presence of frictional forces in the receiver and may persist for relatively long periods of time. These may be visualized by considering that the transmitting member has been moved from one position to another and is stationary thereat, that a signal corresponding to this motion has been transmitted to the receiver where a motor, for example, has been energized thereby and has moved the receiver follow-up member to its final stationary position. When the receiver follow-up member occupies about the same relative position as the transmitting member, the correcting force available to cause further motion of the receiving member may be relatively small. This relatively small correcting force may be insufficient to overcome the frictional force tending to resist motion of the receiver follow-up member, with the result that this member remains more or less permanently out of exact correspondence with the transmitting member.

Follow-up systems may be considered as being of two types, the direct transmission type and the servo mechanism type.

The direct transmission type system may be exemplified by structure wherein a force proportional to the displacement of the transmitter is produced at the receiver, the excursion of whose follow-up member is resisted by a spring. The follow-up member becomes stationary when the force created by the spring is equal to that produced at the receiver. Thus, the force tending to move the receiver follow-up member is the difference between the force received and the spring force. This difference force is resisted by the frictional force present in the receiver, with consequent static error if the frictional force is relatively large. By developing relatively large forces for small excursions of the transmitter, static errors may be reduced, but still may be too large for applications requiring very accurate final positioning.

Servo mechanism follow-up systems are exemplified by structure wherein a signal corresponding to the instantaneous position of the receiver follow-up member is generated at the receiver and is compared with the signal received from the transmitter, and a correcting force corresponding to the difference between the signals, that is the error signal, is applied to the follow-up member. This correcting or difference force is resisted by the frictional forces present in the receiver. In servo type follow-up systems relatively large forces for relatively small error signals may be developed whereby static or frictional errors may be reduced to a negligible value and very accurate final positioning obtained.

Thus, the static forces in the two types of follow-up systems follow the same law, but due to the larger positioning forces available for any given positioning error, static errors may be made much smaller in the servo mechanism apparatus.

Dynamic or transient errors are those due largely to the mass or inertia of the receiving member. They occur because of the inability of the receiver follow-up member to follow correctly very rapid movements of the transmitting member, or other signals with rapid transient components. For example, when the receiver follow-up member has once been set into motion, it tends to swing past the point of correspondence with the transmitting member. Similarly, if the transmitter is set into motion rapidly, it will have moved a substantial distance before the follow-up member begins to move.

Transient errors occur in follow-up systems of the direct transmission type as well as in servo mechanism systems. The larger corrective forces available in servo mechanisms do not reduce transient errors at the same rate at which they reduce static positioning errors, so that the residual transient error is frequently a major shortcoming in prior art apparatus.

In such apparatus, damping is utilized to prevent or reduce overswing and sustained oscillations of the receiving member, such damping being obtained in the case of servo mechanisms by obtaining the first time derivative of the error signal and applying a correcting force proportional thereto. However, such artifices do not reduce transient errors to the point desirable in refined applications.

It is the primary object of the invention to provide improved follow-up systems and apparatus of the character described wherein the dynamic or transient errors of the receiving apparatus are substantially eliminated.

The principle upon which the present invention is based is that of Newton's second law of motion, i. e. the rate of change of the momentum of a body is proportional to the force acting on it and is in the direction of the force; or if stated mathematically, $F=Ma$ where, in a consistent system of units, F is the force applied to a body, M is the mass of that body, and $a$ is the acceleration with which it moves. Inasmuch as the present invention will be described, more particularly, in connection with apparatus utilizing rotating movements, the law of motion may be restated, mathematically, as $T=I\alpha$, where, in a consistent system of the units, T is torque, I is the moment of inertia, and $\alpha$ is angular acceleration.

The application of this law to one form of the present invention may be visualized by considering that two pivoted arms A and B are spaced from each other, each having a certain moment of inertia; that the arms are at rest in corresponding relative positions; and that arm B is to duplicate the pivotal motion of arm A. Suppose that arm A moves rapidly from a position of rest to a new position of rest. During this movement the arm will have experienced, first a positive angular acceleration and then a negative angular acceleration, both of which may be assumed to have a constant magnitude $\alpha_1$. The torque necessary to produce the acceleration $\alpha_1$ of arm A is of no concern inasmuch as arm A is moved by an outside transmitting agent.

A torque $T_2$ directly proportional to $\alpha_1$ may be applied to arm B and under its effect it begins to move. Moreover, it moves with the acceleration $\alpha_2$ determined from the relationship $$T_2 = I\alpha_2 \text{ or } \frac{T_2}{I} = \alpha_2$$

Since torque $T_2$ was asumed to be directly proportional to $\alpha_1$, one may write $T_2 = K\alpha_1$, where K is the factor of proportionality. Hence, it is apparent that $$\frac{K\alpha_1}{I} = \alpha_2$$

and that the acceleration $\alpha_2$ of arm B may be made equal to that of arm A if K is made equal to I. Then, $T_2 = I\alpha_1$, that is, the torque applied to arm B is equal to the product of its moment of inertia and the angular acceleration of arm A. Thus, by a proper selection of forces or torque magnitudes arms A and B can be made to move with the same angular accelerations, positive and negative. It is apparent that two bodies A and B which begin at the same initial velocity, for example zero, and at corresponding initial positions will, when moving with the same acceleration, have at each instant the same velocity and will maintain corresponding positions. Mathematically speaking, the velocity at any instant equals the integral of the acceleration, and the instantaneous position equals the second integral of the acceleration, both these integrals taken over the elapsed time; if the accelerations at A and at B are equal functions of time and if the initial conditions, which correspond to the integration constants, also coincide, the integrals at A and at B must always be equal.

In practice, moving receiving arm B in accordance with the acceleration of arm A over a period of time will fail to reproduce position and velocity accurately, even if the initial conditions were the same at A and B. This is so because the small error continuously produced by frictional forces tends to accumulate. This defect may be eliminated by combining with the system utilizing forces proportional only to acceleration a conventional follow-up system of the servo mechanism or direct transmission type. This follow-up or positioning system makes certain that the initial positions correspond when the arms are at rest, and it also corrects for unavoidable frictional errors as they occur, instead of permitting them to accumulate. Mathematically speaking, the positioning system provides the two integration constants, the initial position and the initial velocity which are needed when acceleration is integrated twice to obtain position as a function of time.

It is essential for proper operation of the apparatus of the character described that the force or torque produced in the receiving device be a linear function only of the signal applied thereto and more specifically, that this force or torque remain unaffected by the position, velocity, or acceleration of the receiving device itself.

The preceding analysis of the character of motion obtained under the sole influence of acceleration forces presumes that the effects of unavoidable frictional forces are negligible; and follow-up systems of the character contemplated by the present invention embody receiving apparatus wherein the follow-up members are driven by motors or other movements which, together with the bearings and pivots of the follow-up members, can be made to have very little friction, so that the main forces required to move the follow-up members from one position to another are forces of acceleration. Furthermore, all of the elements utilized in receiving the signal from the transmitter and acting upon it at the receiver to produce follow-up movement are linear; that is, the output or response from any element is a linear function of the signal supplied to it.

In such systems of negligible friction and linear response, it is characteristic that motion of the receiver may be accomplished primarily and virtually completely by the application of an acceleration force alone. The addition of a positioning system, whether of the servo mechanism type or the direct transmission type, supplements the positioning produced by the acceleration forces, this being necessary only because the acceleration forces will not reproduce velocity and position over relatively long periods of time. In operation, the supplementary positioning system merely supplies the small forces required to overcome unavoidable friction; this remains true during rapid motions when the acceleration forces may exceed the frictional forces by a large factor. In other words, for all transient motions the follow-up member is positioned substantially by the acceleration forces, with the positioning system providing a secondary correction during periods of slow uniform motion or standstill.

A system according to these principles may be a tele-autographic receiver or a high speed recorder, where the follow-up members are driven by linear electromagnetic movements supplied with current from vacuum tube amplifiers. Linear electromagnetic driving units or galvanometric type movements such as utilized in electrical measuring instruments may, for example, be of the character wherein a moving coil is pivotally mounted in a magnetic field which may be obtained by permanent magnets. Such a movement can be made virtually frictionless and highly linear.

The method of utilizing a servo mechanism positioning device in combination with a force corresponding to the acceleration of the sending member for positioning a follow-up member is known where the predominant force desired and necessary is the positioning force supplied by the servo mechanism, while the acceleration force tends to reduce transient errors. Such known systems include structures where a massive element such as a searchlight or gun follows the movements of the gun directing device, for example, a sighting element or telescope. The searchlight or gun is driven by hydraulic mechanisms or electric motors and utilizes large amounts of power to overcome large frictional forces, even though the movement is made as frictionless as possible through the use of good bearings.

While the large friction encountered in such bulky mechanisms would of itself make it difficult to utilize acceleration forces except in the manner of a correcting influence, a second factor must be considered. In systems for moving massive members, while the acceleration forces are large, they are large only because the mass to be moved is large, not because the acceleration is high. The accelerations observed in the movements of searchlights and guns are rather small compared to those which occur in fast recording movements or in handwriting movements.

Finally, a third factor which must be considered is the requirement, stated previously, that the acceleration force must be a linear function of the applied signal only. This condition becomes increasingly difficult if not impossible to meet when large forces are needed; electric or hydraulic motors, in connection with their sources of power, hardly fulfill to the degree required the condition that the torque at any instant must be proportional to an applied current or voltage, without being influenced by the position or speed of the motor at that instant. Inaccurate application of acceleration forces, however, would lead to large cumulative positioning errors which the servo mechanism would then be called upon to correct.

For these reasons, a force corresponding to the acceleration of a sending member, while having been used in connection with massive follow-up apparatus, could merely serve as a secondary correction, while the primary forces were supplied by a servo mechanism.

It is an object of the invention, by utilizing the excellent linearity of galvanometric movements and of vacuum tube amplifiers, in combination with the small friction encountered in movements of this type, to provide improved follow-up systems and apparatus wherein transient errors as well as static errors of the receiving apparatus are substantially completely eliminated.

It is a further object of the invention to provide improved linear tele-autographic and recording systems and apparatus of the foregoing character wherein transient errors and static errors of the receiving apparatus are substantially completely eliminated.

It is a further object of the invention to provide improved follow-up systems and apparatus of the character described wherein the primary positioning is obtained from an acceleration force and a correction thereto is obtained from a simple positioning force.

In carrying out the invention in one form, a follow-up system receiver is provided comprising, a follow-up element which assumes a position corresponding to the frequency of a transmitted voltage, means for positioning said follow-up element by the application of a force proportional to the second time derivative of said frequency, and secondary means for causing said follow-up element to assume the desired initial position with zero velocity thereat.

For a more complete understanding of the invention, reference should be had to the accompanying drawings in which:

Figure 1 is a diagrammatic view of follow-up apparatus embodying the invention;

Fig. 2 is a diagrammatic view of tele-autographic apparatus embodying the invention;

Fig. 3 is a diagrammatic view corresponding to Fig. 2 with certain components illustrated more completely;

Fig. 4 is a circuit diagram of a component illustrated by block diagram in Fig. 3;

Fig. 5 is a diagram for illustrating the manner of operation of one component illustrated in Fig. 3;

Fig. 6 is a diagram for illustrating the manner of operation of another component illustrated in Fig. 3, and Fig. 7 is a digrammatic view of a modified form of tele-autographic apparatus embodying the invention.

Referring to Fig. 2, the invention is shown embodied in a tele-autographic system including a sending or transmitting station S and a receiving station R. While the invention will be described as though transmission of handwriting or the like were taking place from station S to station R, it will be understood that this is exemplary, and that suitable apparatus may be provided at each of the stations so that transmission and reception may take place in both directions.

Station S may comprise a writing surface 10, a writing stylus 11, a linkage mechanism 12 connected to the stylus, and a pair of oscillators 13 and 14 for generating voltages in two channels X and Y which correspond respectively to movements of the stylus along coordinates X and Y of the writing surface. Each channel may comprise a separate band of frequencies. The voltages generated by oscillators 13 and 14 are transmitted over a transmission line 15 to receiving station R where, after suitable filtering, amplifying, and treating according to the invention, to be more completely described hereinafter, the signals are utilized to move a stylus 16 over a writing surface 17 along coordinates X and Y thereof corresponding to coordinates of the same designation at the sending station.

Linkage mechanism 12 comprises two pairs of links 18, 21 and 22, 23 pivoted to each other and forming a parallelogram as shown. Link 21 is pivotally mounted at its free end on a shaft 24 which is connected by a link member 25 to the adjusting arm of a variable inductor 26, the variable inductor being connected in parallel to a condenser 27. The parallel combination of the variable inductor and condenser is connected to the Y oscillator, as shown, and forms the frequency determining circuit therefor. Correspondingly, the free end of link 23 is mounted on a shaft 28 which in turn is connected by means of a link 31 to the frequency determining circuit (not shown, in the interest of drawing simplicity) of X oscillator 14.

While link mechanism 12 has been shown as comprising a parallelogram, it is not essential that this be the case so long as movements of stylus 11 along two coordinates cause the generation of signals (voltages of variable frequency from oscillators 13 and 14) corresponding to movements along those coordinates.

Signals generated by the oscillators X and Y and receiverd at station R are separated into two channels by X and Y filters 32 and 33, respectively, the Y signal being utilized to cause movement of link member 34 to effect motion of stylus 16 along the Y coordinate and X signal being utilized to cause movement of link 36 to effect motion of stylus 16 along the X coordinate.

Amplifiers 39 and 40 may be utilized to amplify the received signals before passing them on to the remaining apparatus. In Fig. 2 the apparatus following amplifier 40 (X channel) is not shown in the interest of drawing simplicity inasmuch as it resembles that shown for the Y channel.

The various links of the linkage mechanism at the receiving station are pivoted together and form a parallelogram, as shown, although this is not essential so long as the form of the linkage corresponds to that at the transmitting station whereby correspondiig movements may be obtained.

The free end of link 34 is connected to a shaft 38 on which is mounted the actuating coil 41 of a galvanometric unit 42. The galvanometric unit is of the type wherein coil 41 moves in a magnetic field which may be supplied preferably by permanent magnets. Voltage applied to coil 41 through conductors 43 and 44 from D. C. amplifier 45 causes movement of coil 41, and thus link 34 and stylus 16 along the Y coordinate. Similarly, voltage is applied to the moving coil of a galvanometric unit 46 for driving arm 36 and consequently stylus 16 along the X coordinate, the galvanometric units 42 and 46 being substantially similar in all respects. The moving coils of the galvanometric units may, for example, be wound on forms which are approximately square, with an edge dimension of from one to two inches. The coils are arranged to rotate in an annular gap in the manner of d'Arsonval meters. A stationary field of a few thousand gauss is supplied by permanent magnets. It has been found that such movements develop sufficient torque to provide the accelerations which occur in fast handwriting, so long as the linkage and stylus have reasonable mass and a maximum electrical power of a few watts is available during periods of peak torque. The required power is easily and economically produced by small vacuum tubes.

The moving coils may be mounted on pivot bearings or ball bearings in order to reduce friction to a minimum; similarly, friction in the pivots connecting the four links, as well as friction between stylus 16 and writing surface 17, is kept to a minimum, so that the predominant force needed for normal handwriting movements is that necessary to accelerate the various moving parts.

The Y band or channel of frequencies is received and operated upon at station R by the acceleration control system 47 and by the positioning correction system 48. This system may be of the servo mechanism type, in which case a link 51, shown dot-dash, is provided between one end of link member 34 and the positioning correction system 48 so that an error signal may be produced in system 48; a similar link, not shown, will of course be provided for arm 36. If the positioning correction system is of the direct transmission type, springs 52, shown dotted, are associated with arm 34 in order to bring back this arm to a normal position after departure therefrom. Similarly, springs (not shown) will then be associated with arm 36.

While the apparatus for the Y channel has been shown, it will be understood that corresponding apparatus is provided for the X channel.

Referring more particularly to Fig. 3, there is shown a system corresponding to Fig. 2 wherein preferred forms of the acceleration control system 47 and of the positioning correction system 48 at station R, indicated in block diagram form in Fig. 2, are shown in detail. In this figure the apparatus at station S, and up to amplifier 34 in the Y channel at station R, is the same as shown for Fig. 2; the stylus 16 and the links for driving it are omitted in Fig. 3 for the sake of clarity, while the galvanometric unit 42 is shown in diagrammatic form only.

Assuming that handwriting is being transmitted, the representative signals for the Y channel are separated by the Y filter and amplified in amplifier 39 and fed into the apparatus shown.

The Y signal is a voltage of variable frequency, whereby the frequency at any instant is indicative of the Y coordinate at that instant. From amplifier 39 this signal is first fed into the control grid of limiting tube 53 of the pentode type, the screen grid and the plate being connected to a source of D. C. voltage B+. The suppressor grid is connected as shown, and the cathode is connected to ground through a resistor and condenser. The various circuit constants and the voltage applied to tube 53 may be so chosen that the amplitude of the tube output is constant irrespective of the amplitude of the signal fed to the control grid so long as the signal input amplitude exceeds a predetermined minimum. After limiting in tube 53 the signal is supplied through various circuits to tube 54 of the pentagrid converter type and through a filter network 55 to point 56; these components and circuits together constitute a discriminator and filter wherein a D. C. voltage proportional to the frequency of the incoming signal is produced. From point 56 the signal is fed into a network for producing the second time derivative of the signal at point 56, this network comprising condenser 57, resistor 58, tube 59 with its appropriate circuit elements, and condenser 61 and resistor 62. The second time derivative or acceleration signal is fed into the D. C. amplifier 45 through conductor 63 and thus to the coil of galvanometric unit 42.

Having the foregoing circuit components and their functions in mind, the detailed operation thereof may best be understood by considering Fig. 3 in connection with Figs. 5 and 6. It is assumed that the band of frequencies for transmitting motions along the Y coordinate extends from 2100 cycles per second to 2300 cycles per second. Assume further that in the first instance the movements are stationary, that the stylus at station R occupies the same relative position as the stylus at station S, and that the positions are such that the particular signal frequency being transmitted from station S is 2200 cycles per second.

Proceeding first to describe the circuit for producing the D. C. voltage proportional to frequency at point 56, this voltage is produced by controlling the current flow through tube 54 by means of the voltages on its grids 64 and 65. The voltage on grid 64 is supplied from a circuit including the condenser 66 in series with the parallel combination of condenser 67 and inductor 68, these circuit components being connected between the plate of tube 53 and ground. Condenser 67 and inductor 68 are tuned to resonance at the center of the band of frequencies, that is 2200 cycles per second, and condenser 66 is so chosen that it has a relatively high impedance to this frequency and the major portion of the voltage drop appears thereacross. At resonance the parallel combination of condenser 67 and coil 68 presents a resistance to current flowing through condenser 66 due to the small amount of damping, shown schematically as resistor 71, which may merely represent the natural loss resistance of coil 68. Thus the voltage applied to grid 64 through resistor 69 is approximately 90° out of phase with the voltage at the plate of tube 53. This voltage is shown in Fig. 5 as the sine wave 72.

The voltage on grid 65 is obtained from a secondary coil 73 of relatively few turns on a transformer whose primary coil 74 is connected to the plate of tube 53 through conductor 75. Coil 74 is tuned to resonance at 2200 cycles per second by means of condenser 76 in order to improve the power output and reduce harmonic content. Since coil 73 is closely coupled to coil 74, the voltage induced in coil 73 is in phase with the voltage between the plate voltage of tube 53 and ground. The voltage of coil 73 is applied to grid 65 through resistor 80; it is shown in Fig. 5 as the sine wave 77. Accordingly, the voltage on grid 65 at resonance is approximately 90° out of phase with the voltage across grid 64 and the connections may be so chosen that the voltage of grid 64 leads the voltage of grid 65 by approximately 90°. This condition, however, prevails only as long as the received signal matches the resonant frequency of condenser 67 and coil 68.

As the frequency received by tube 53 increases above 2200 cycles per second, the voltage of grid 64 leads the voltage of grid 65 by a lesser amount, this being shown by the dotted sine wave 78. Correspondingly, when a frequency below 2200 cycles is received, the voltage of grid 64 leads the voltage of grid 65 by an amount greater than 90°, this being shown, for example, by the dotted sine wave 79.

The plate of tube 54 is connected through a resistor 81 to a source of positive D. C. voltage B+, as are the grids functioning as screen grids. The plate of tube 54 is also connected through conductor 82 to filter network 55.

Under the assumed condition that a voltage of 2200 cycle frequency is being received, the amount of current flowing in the plate circuit of tube 54 is sufficient to produce a certain voltage at conductor 56.

In Fig. 5 the horizontal dashed line 83 represents the cut-off voltages of both grids 64 and 65; for voltages more negative than this value no plate current flows. Hence, so far as grid 64 is concerned, current would flow in the plate circuit of tube 54 from point $a$ to point $b$ of sine wave 72. Likewise, so far as grid 65 is concerned, the plate current would flow from point $c$ to point $d$ of sine wave 77. Since beyond the respective points indicated for each grid plate current is cut off by that grid, it is apparent that current can flow in the plate circuit of tube 54 only during that portion of each cycle where the two regions overlap; that is, between points $c$ and $b$. Accordingly, for the received signal of 2200 cycles per second, a plate current impulse of length $cb$ flows during each positive half cycle of the grid voltages. Each plate current impulse flowing through resistor 81 causes a voltage drop to occur therein, and condenser 84 is discharged by an amount determined by the duration of the pulse. During the interval between pulses, condenser 84 is recharged through resistor 81. An equilibrium is so established, with the potential of conductor 82 pulsating about an average level. Low-pass filter network 55 suppresses the fast pulsations but a direct current potential equal to the average potential level at conductor 82 appears at point 56.

If the frequency of the received signal increases, the phase at grid 64 changes as indicated by the sine wave 78. Accordingly, the period during which this grid would permit plate current to flow is shifted to the region between points $e$ and $f$. Sine wave 77, however, remains in the same relative position. The length of the plate current pulse has therefore been increased from $cb$ to $cf$. The longer current pulses flow through resistor 81, causing the voltage of conductor 82 to decrease for longer periods, and the condensers of the filter network are charged up to a lesser voltage.

Correspondingly, if the frequency of the incoming signal decreases below 2200 cycles per second, the voltage of grid 64 leads the voltage of grid 65 by a greater amount, as indicated by sine wave 79, thereby changing the length of time during which this grid would permit plate current to flow to the region between points $g$ and $h$. Sine wave 77 still occupies the same relative position, the length of time during which overlap occurs, that is, plate current flows, has been decreased from $cb$ to $ch$. Accordingly, shorter pulses of current flow through resistor 81 during each cycle, causing the voltage of conductor 82 to decrease for lesser intervals of time and the condensers of the filter network are charged to a higher voltage.

When the movement 42 at station S is stationary, as has been assumed, condensers 57 and 61 of the acceleration network are charged to constant voltages. Accordingly, no current flows in resistor 58 and through conductor 87, and the D. C. amplifier 45 receives no acceleration voltage.

In Fig. 6 there is shown a curve $f$ indicating how the voltage at point 56 may vary with a signal frequency which begins at 2200 cycles per second, increases to 2300 cycles per second, and decreases to 2100 cycles per second in a relatively short time. The 2300 cycle signal is shown below the axis since an increase in frequency causes a decrease in voltage at point 56. Correspondingly, a signal of 2100 cycle frequency is shown above the axis. As the signal changes in a continuous manner from 2200 cycles per second to 2300 cycles per second (Fig. 6), a decreasing voltage appears across point 56 and condenser 57 begins to discharge through resistor 58 and other portions of the circuit. As it does so current, of course, flows in resistor 58, the current being equal to the time rate of change of charge on the condenser, that is $$\frac{dq}{dt}$$

The current flowing through resistor 58 causes a voltage drop thereacross and thus applies a negative voltage to the grid of tube 59, this being shown in Fig. 6 as the curve $$\frac{df}{dt}$$

and is shown negative for the change from 2200 cycles per second to 2300 cycles per second inasmuch as it represents a discharging of the condenser with current flow corresponding thereto. As the frequency departs from 2200 cycles per second (curve $f$), condenser 57 begins to discharge at a certain rate $$\frac{dq}{dt}$$

whereby voltage appears across resistor 58, and as the frequency approaches 2300 cycles per second and condenser 57 approaches its new charge, the rate of change of charge decreases. Specifically, the rate of change of charge on condenser 57 begins at zero, reaches a negative maximum and increases again to zero, so that the voltage on the grid of tube 59 changes from zero to a negative value and then increases to zero again. The voltage drop across resistor 58 at any instant is proportional to the Y component of the velocity of the sending element at that instant. Variations of the voltage on the grid of tube 59 appear amplified and with reversed polarity at the anode of this tube, to which condenser 61 is connected.

During the transition from 2200 cycles per second to 2300 cycles per second, the rate of change of charge on condenser 57 is itself changing, and thus the voltage applied to condenser 61 changes and it has a corresponding rate of change of charge, this being shown in Fig. 6 as $$\frac{d^2f}{dt^2}$$

As condenser 57 discharges to a lower voltage, the grid of tube 59 goes negative, so that condenser 61 is charged to a higher voltage. Proportional to the rate of change of charge of condenser 61 is the current flow in resistor 62 and the other resistance in the ground return circuit, and the voltage drop across the resistors due to this current is applied to amplifier 45. Because of the reversal in phase through tube 59, the second derivative or acceleration voltage is shown positive, while the first derivative or velocity voltage is shown negative. Where the rate of change of charge on condenser 57, corresponding to the velocity, reaches a maximum negative value, the rate of change of charge of condenser 61 is zero. At this point there is a change from positive acceleration to negative acceleration. As the frequency approaches 2300 cycles per second, the acceleration again approaches zero. Thus as the frequency changes from 2200 cycles per second to 2300 cycles per second, the first derivative or velocity voltage decreases from zero to a negative maximum and then increases to zero again, whereas the second derivative or acceleration voltage increases positively to a maximum, decreases to zero, goes to a negative maximum and then increases to zero again.

The acceleration voltage is applied through conductor 87 to amplifier 45. Coil 41 of galvanometric element 42 therefore receives a current which increases positively to a maximum, decreases and goes negative to a maximum, and then increases therefrom to zero. Consequently, the follow-up element, that is, links 34, 35 and thus stylus 16, driven by coil 41, experiences a positive force which increases in magnitude to a maximum, decreases and goes negative to maximum, and then returns to zero again. During this application of force or torque, the arms are first accelerated; when the acceleration voltage goes negative a reverse force is applied and the arms are decelerated, the forces being such that the movement is accelerated from zero speed and decelerated to zero speed, coming to rest in its final correct position.

The D. C. amplifier 45 is of the balanced type wherein both positive and negative output voltages are obtained.

If the frequency is changed from 2300 cycles per second to 2100 cycles per second, this change may be represented as shown in Fig. 6. The reverse effects occur. Since the frequency is decreasing the voltage across condenser 57 is increased so that this condenser charges up, and the resulting current increases the voltage of the grid of tube 59. This in turn causes a decrease in the voltage to which condenser 61 is charged, the resulting current again providing a second derivative or acceleration voltage. Here the acceleration voltage applied is first negative and the follow-up mechanism is accelerated in the negative direction; and then a positive voltage appears and slows down the follow-up mechanism which is still moving in the negative direction, these two being so related that the follow-up mechanism reaches the final position with zero velocity.

Amplifier tube 59 is needed because considerable attenuation of the signal occurs in the first and second derivative networks. Amplifier 45 is necessary to produce the power output required for producing the maximum torque encountered during rapid writing.

The gain of the amplifiers is adjusted to produce in coil 41 a torque of such magnitude, in relation to the mass of the moving parts, that the resulting acceleration produces motion of the follow-up elements which corresponds precisely to the motion of the transmitting stylus, without the presence of a signal from the positioning correction mechanism 48. It is hereby assumed that the sending stylus and the receiving stylus begin at the same point relative to each other with zero velocity.

The voltage proportional to the acceleration of the incoming signal is able to produce motion of the follow-up member in exact correspondence with the transmitting member so long as the friction of the follow-up member is reduced to a negligible value and the mass of the members is reasonable so that the necessary forces, i. e. current amplitudes, may be obtained without exceeding the mechanical strength of the apparatus and without exceeding the linear range of the electrical components, including the derivative networks and amplifiers.

The servo type positioning system 48 associated with Figs. 2 and 3 will not be described, this circuit being disclosed and claimed in a copending application of Robert Adler, Serial No. 81,709, filed March 16, 1949, entitled Improvement in Follow-up Apparatus and Systems, and assigned to the same assignee as the present invention.

Briefly, this circuit comprises a discriminator which includes a variable passive frequency sensitive network coupled to the follow-up element. The output signal from the discriminator at each instant corresponds to the frequency mismatch between the frequency of the incoming signal and the frequency to which the variable passive frequency sensitive circuit is tuned.

The two plates of a double diode tube 91 are connected to the ends of a winding 92 which has a relatively large number of turns compared to the number of turns of winding 73, windings 73 and 92 being both secondaries of a transformer whose primary winding is 74. The cathodes of tube 91 are connected together through a condenser 93, and one of them is grounded as shown. Resistors 94 and 95 are shunted across the cathodes and plates of the respective diodes sections. The output of the double diode is taken through resistor 62 and fed to amplifier 45. The ungrounded end of winding 73 is connected through a variable inductor 96, which in turn is connected to a condenser 97 grounded, as shown. It is apparent that winding 73 forms a series circuit with inductor 96 and condenser 97, and the variable inductor 96 and condenser 97 are so chosen that these two elements may be tuned to series resonance with the incoming signal throughout the range of operation. The junction of inductor 96 and condenser 97 is connected by means of a condenser 98 having virtually zero impedance at the frequencies used to the midpoint of winding 92 as shown. The control arm for varying inductor 96 is connected by means of link 51 (schematic) to the follow-up arm connected to galvanometric element 42.

As pointed out in the application referred to, the voltage applied to the two diode sections of tube 91 is the voltage across condenser 97 and the voltage across the respective halves of winding 92. When the frequency to which the circuit 96, 97 is tuned equals the incoming frequency, the voltages applied to the diode section are equal and since they are subtractively connected to the output circuit the voltage applied to amplifier 45 is zero. However, when the frequency increases, the voltage across the upper diode section increases over that across the lower diode section whereupon a positive voltage is obtained, tending to move the follow-up element in one direction. As it moves, link 51 adjusts inductor 96 to resonance with condenser 97 at the increased frequency, whereupon the output voltage is reduced to zero. Correspondingly, when a signal of decreased frequency is received, the voltage across the lower diode section increases over that of the upper diode section, with the result that a negative voltage is applied to D. C. amplifier 45 to cause movement of the follow-up element in the reverse direction. Again the link 51 adjusts inductor 96 to tune the passive frequency sensitive circuit 96, 97 to resonance at the new frequency whereupon the movement comes to rest.

The addition of the positioning correction system 48, as pointed out, is only necessary to make certain that the follow-up element does not drift over a period of time and to supply the small forces necessary to overcome the slight friction which may be present. Furthermore, if the system has not been used for some time, the follow-up mechanism at station R may have been moved to a position not in conformance with that at station S. Under these circumstances, if only the acceleration control voltage were used, there would never be any correspondence between the follow-up member and the transmitting member. The presence of the positioning correction voltage insures conformance when operation is first instituted as well as at all times subsequently.

In Fig. 4, there is illustrated one form of balanced D. C. amplifier which may be used as amplifier 45. In this amplifier two three element tubes 101 and 102 are used, with their plates connected to a source of B+ voltage and their cathodes connected through cathode resistors 103 and 104, respectively, to ground. The moving coil 41 of galvanometric unit 42 is symmetrically connected across the two cathodes, as shown. The grid of tube 101 is connected between the plate of tube 105 and resistor 106, and the grid of tube 102 is connected between the plate of tube 107 and resistor 108, resistors 106 and 108 being connected to the source of B+ as shown. The cathodes of tubes 105 and 107 are connected together and through a resistor 109 to a source of negative voltages B−.

If the amplifier of Fig. 4 is used in place of amplifier 45 of Fig. 3, the conductor 63 is connected to conductor 111 leading to the grid of tube 105, and the grid of tube 107 is grounded as shown.

With no voltage applied to conductor 111, the grids of tubes 105 and 106 are at ground potential; the grids of tubes 101 and 102 are at equal potentials, and equal currents flow through resistors 103 and 104. Consequently, there is no voltage drop across coil 41 and no current therethrough. When a positive voltage is applied to conductor 111, whether by the acceleration control network or by the positioning correction network, tube 105 conducts more current, which current flowing through resistor 109 drives the cathode of tube 107 more positive, thereby in effect increasing the bias of this tube inasmuch as the grid thereof is grounded. Accordingly, the current flow through tube 107 decreases while the current flow through tube 105 has increased. Consequently, the grid of tube 102 increases in voltage and the grid of tube 101 decreases in voltage; the currents through resistors 103 and 104 decrease and increase respectively, causing an unbalance of voltage which appears across coil 41 of movement 42 with consequent current flow therethrough. The reverse operation occurs when a negative voltage is applied to conductor 111.

In linear electromagnetic type movements an electromotive force (E. M. F.) is generated in the coil when it moves. The presence of this E. M. F. tends to affect the current through the movement so that this current is no longer under the exclusive control of the applied signal. To eliminate this effect, the coil of the movement may be supplied with current from a direct current amplifier having a relatively high output impedance approximating the theoretical ideal of a source of infinite impedance. In this case the E. M. F. generated in the moving coil is unable to affect the current supplied to it from the amplifier. Alternatively, an amplifier having low output impedance may be used and a second E. M. F. may be derived from the received signal and applied to the amplifier, in a manner to be described later, so as to cancel out the E. M. F. generated in the coil.

For a relatively small difference in frequency between the incoming signal and the resonant frequency of circuit 96, 97, a large correcting voltage may be produced by amplifier 45. Accordingly, any positioning error caused by the E. M. F. generated in the movable coil 41 of galvanometric unit 42 immediately provokes a strong error signal, and for this reason the E. M. F. generated in coil 41 does not normally interfere with proper operation. However, it is possible to design amplifier 45 with high internal impedance relative to that of coil 41, so that the E. M. F. generated in the coil has a very small effect on the current therethrough.

In the event that it is desired to compensate for the E. M. F. generated in coil 41 during its motion, a compensating voltage may be introduced into the coil through the D. C. amplifier shown in Fig. 4. Since the E. M. F. generated in the coil of the moving instrument is proportional to the velocity of the coil and opposes the movement, the desired compensating voltage is also proportional to the velocity but must be introduced in opposite phase. It was mentioned before that the voltage drop across resistor 58 of Fig. 3 is proportional to the velocity of the transmitting element at station S, and is therefore also proportional to the desired velocity of the follow-up element at station R. Accordingly, a proper proportion of the voltage generated in resistance 58 may be tapped off by a conductor 112 and fed to tube 107 through conductor 113. When this is done, the ground connection to the grid of tube 107 is removed. Feeding a voltage from resistor 58 to the grid of tube 107 supplies a voltage proportional to the desired velocity of the follow-up member in the correct phase to the amplifier so that the corresponding output voltage appearing across coil 41 is equal and opposite the E. M. F. generated in the coil, and thus balances out the E. M. F. generated by movement of the coil. Accordingly, no current component due to the E. M. F. appears in the coil and the motion takes place without the introduction of an error.

In servo mechanisms of the prior art, it is known to produce damping of the follow-up element by obtaining the first time derivative of the error signal and applying a force proportional to this derivative to the follow-up element. It is within the scope of the invention to apply such error-rate damping to the positioning correction system 48. In the embodiment illustrated in Fig. 3, such error-rate damping may, for example, be obtained by inserting a parallel combination of a resistor and a condenser in series with resistor 62 into the output of the positioning correction system. If the amount of error-rate damping so obtained is not sufficient, the output voltage from the positioning correction system may be taken off at the junction point of resistors 94 and 62 and amplified in an additional tube which may be a triode; the amplified and inverted error signal which appears at the plate of this triode may then be differentiated by a condenser and a series resistor, the latter to produce thereacross a voltage proportional to the rate of change of error. This voltage may then be fed into input lead 113 of tube 107 in the D. C. amplifier shown in Fig. 4, the ground connection from this point having been removed.

Use of these or other methods of obtaining error-rate damping in the positioning correction system does not interfere with the function of the acceleration control system previously described. It must be kept in mind that, during normal operation of the instrument, the output voltages from the acceleration control system may reach high values during periods of peak acceleration, but that the output voltage from the positioning correction system is limited to the small values required to produce enough torque to overcome friction. The error voltage at any instant being small, the error rate voltage also remains small during normal operation.

If the movement were completely frictionless, the positioning correction system would still be necessary to insure correct initial position and initial velocity, and the error-rate damping would still be useful to insure stability of the positioning correction system; but in operation, the output voltage from this system as well as its first derivative would remain zero at all times.

The use of error-rate damping will also fail to interfere with the method, previously described, of compensating for the E. M. F. generated in the moving coil by introducing a balancing voltage proportional to the velocity of the sending element in series therewith; for best performance, it is preferred to apply error-rate damping and E. M. F. compensation simultaneously.

In Fig. 7 there is shown the invention as applied to a follow-up system with positioning correction of the direct transmission type, wherein certain economies are obtained by the use of a discriminator which serves not only the acceleration control system but also, simultaneously, the positioning correction system.

The apparatus at sending station S and at the receiving station R up through the filters and first amplifiers is the same as illustrated in connection with Fig. 2, and corresponding parts bear the same reference characters. The signal used for transmitting the writing is the varying frequency of a voltage, and a direct current voltage is generated at point 114, which D. C. voltage is proportional to the transmitted frequency. The D. C. voltage at point 114 is generated by a discriminator 115 which is so constructed that the D. C. voltage output is zero at the mid frequency of the band, that is 2200 cycles per second, and positive and negative voltages are produced respectively for positive and negative frequency deviations. The D. C. voltage at point 114 is differentiated twice with respect to time in the ensuing differentiating circuits 116 and 117 and the resulting acceleration signal is applied through conductor 118 to the input of amplifier 119. For purposes of positioning correction, the D. C. voltage from point 114 is fed directly through a conductor 121 and a resistor 122 to the input of amplifier 119.

The operation of the circuit of Fig. 7 will now be explained more completely. The signal from amplifier 39 is applied to the pentode type tube 53 similar to the corresponding tube of Fig. 3 which limits the amplitude of the applied signal in substantially the same manner as shown on Fig. 3. The plate of tube 53 is connected to a tuned circuit consisting of the primary 123 of a loosely coupled transformer and a condenser 124, the resonant frequency of this circuit being the midpoint of the frequency band or 2200 cycles per second. The secondary winding 125 of the transformer is tuned by a condenser 126 to the same frequency, the parallel combination of coil 125 and condenser 126 being connected to the plates respectively of tubes 127 and 128. The cathodes of tubes 127 and 128 are connected together through a condenser 129 and the latter is grounded as shown. To complete the necessary circuits for discriminator 115, resistors 131 and 132 are connected across the plates and cathodes. Coils 123 and 125 are loosely coupled to each other, and a condenser 130 having subsbtantially no impedance at the frequencies used is connected from the plate of tube 53 to the midpoint of winding 125. The circuit as shown is a discriminator of a well known type and produces a D. C. voltage at point 114 which becomes positive or negative depending upon whether the frequency of the voltage applied is greater or smaller than the midpoint frequency, this being accomplished in a well understood manner.

Differentiating circuits 116 and 117, together with amplifier tubes 133 and 134 constitute an acceleration control network similar to the one already described. Tube 133 is a triode, as shown, whose plate is connected through a resistor 135 to a source of D. C. voltage B+ and whose cathode is connected through a resistor 136 to ground. On the plate of tube 133 there appears a D. C. voltage which is equal to a certain reference potential when the incoming signal has a frequency equal to the mid-frequency of discriminator 115. For positive or negative frequency deviations, the potential of the plate decreases or increases in proportion, as does the potential at point 56 in Fig. 3.

The following network, consisting of differentiating circuit 116, amplifier tube 134 and second differentiating circuit 117, correspond in their mode of operation to condenser-resistor combination 57—58, tube 59 and a condenser-resistor combination 61—62 of Fig. 3. Specifically, a voltage proportional to the velocity of the sending element is produced across the first differentiating resistor 138; a voltage proportional to the acceleration of the sending element is produced across resistor 141.

Amplifier 119 is a balanced amplifier of the character shown in Fig. 4, and comprises a pair of tubes 144 and 145 connected as shown with the coil 41 of movement 42 connected across balanced points of the cathodes. Spring 52 is connected to the follow-up member so as to tend to maintain the follow-up member in its midpoint or neutral position. The grids of tubes 144 and 145 are controlled by the plate voltages of tubes 146 and 147, as already described. The cathodes of tubes 146 and 147 are connected through a resistor 148 to a source of negative D. C. voltage B−, as shown. The voltage from the acceleration network and the positioning correction voltage through resistor 122 are applied to the grid of tube 146 through conductors 118 and 121. When no signals are received the currents through tubes 144 and 145 are balanced, but when a signal is received at the grid of tube 146 the currents through these tubes become unbalanced, thereby causing currrent to flow in the winding 41. The movement continues its motion until the force developed in spring 52 is equal to the force caused by current in the winding, the positioning signal applied remaining present inasmuch as this is a direct transmission system.

It is, of course, necessary that acceleration voltages and positioning control voltages impressed upon the grid of tube 146 be of corresponding polarity. In the circuit shown in Fig. 7, this condition is automatically fulfilled, since both voltages are originally derived from a common point 114; the acceleration network contains two amplifier tubes, and the resulting polarity of the acceleration voltage is therefore the same as if no tubes at all were used in this network.

The net or difference force tending to move the follow-up element is the difference between the spring force and the force developed in the coil by the current therethrough. Inasmuch as this difference in force may be relatively small, the amount of positioning force available may also be relatively small; the acceleration signal, however, carries the follow-up element through the fast motions encountered in handwriting, except for small frictional forces which are overcome by the positioning correction network.

The adjustment of the acceleration network is correct when, without the positioning correction voltage present and with spring 52 removed, the acceleration network effects movement of the follow-up member in correspondence with the sending member when the two members start at the same point with zero velocity. The positioning correction system is then adjusted in cooperation with the spring to maintain these initial conditions at all times.

In the direct transmission type of follow-up system, it is essential that there be complete linearity throughout the various components, and with the relatively small difference force available the E. M. F. generated in the coil during motions of the galvanometric unit may be sufficient to cause serious distortions. Accordingly, in this embodiment of the invention a signal proportional to the velocity of the sending element is normally transmitted from a portion resistor 138 through conductor 149 to the grid of tube 147. The signal is applied to the grid of tube 147 for the same reason as pointed out in connection with Fig. 2. With the tap on resistor 138 correctly adjusted the E. M. F. is balanced out, there are no current components due thereto flowing in the coil of the movement, and thus operation is undisturbed.

In the form of the invention shown in Figs. 3 and 7, only the apparatus for the Y coordinate of motion has been described. It will be apparent that corresponding apparatus is provided for the X coordinate of motion and that the two are combined by the linkage mechanism to drive a writing stylus. The band of frequencies for the X coordinate may be, for example, 2700 to 2900 cycles per second.

In Fig. 1 there is shown a form of the invention particularly suitable for high speed recording or telemetering of rapid transient phenomena. The information which is to be recorded is converted at the sending end S into a variable D. C. voltage, with the magnitude of that voltage representing the variable function of which a record is desired. In Fig. 1, the apparatus at the sending end is shown schematically, comprising an instrument pointer 151 which drives a rheostat 153 through a link 152. Pointer 151 may be, for example, the indicator of a fast-responding pressure gauge. A fixed resistor 154 and a battery 155 are provided, and the variable D. C. signal is sent to the receiving end R through the two-wire line 156. It will be understood that the manner in which the D. C. signal is produced at S does not form part of the invention, and that the receiving equipment at R may serve to record any variable voltage signal no matter what its origin may be.

At the receiving end R, the incoming signal may be brought up to the required level by a linear D. C. amplifier 157. The high-level signal is then passed through an acceleration control network 158 consisting of two steps of differentiation with respect to time, preferably separated by an amplifier. The output voltage from the acceleration control network, which is proportional to the second time derivative of the signal originally received, may be further amplified in a linear D. C. amplifier 161; it is then used to produce a proportional torque in the galvanometric recording unit 164.

The positioning correction system may, in this case, be of the direct transmission type or of the servo type, depending on the accuracy required in recording slowly varying or stationary voltage signals. As was explained previously in connection with tele-autographic devices, the acceleration control network is capable of reducing the transient errors to zero, subject only to the limiting condition that the transients to be recorded do not call for accelerations which exceed either the linearity limits of the amplifiers or the mechanical strength of moving parts.

The signal outputs from the acceleration network and from the positioning correction system are combined in the D. C. amplifier 161 and the output thereof is fed through conductors 162 and 163 to the coil of galvanometric unit 164. The galvanometric unit comprises a moving arm 165 which may record the transmitted information upon a moving roll of paper or other medium. If the system is of the servo type, a link 166, shown dotted, may serve to compare the instantaneous position of the arm 165 with the incoming signal so as to produce an error signal as already described. If the system is of the direct transmission type, springs 167 may be provided for tending to return arm 165 to its initial position.

In this instance, also, it is essential that the frictional forces are reduced as much as possible so that the acceleration voltage is sufficient for moving the recording arm from one position to another, especially during rapid transients, and the positioning correction system is utilized only to overcome the small frictional forces and to make certain that the initial position and the initial velocity of the recording pointer correspond to the magnitude and rate of change of the received signal.

While transmission by means of variable frequency and variable D. C. over a wire line has been described, it will be understood that other means of transmitting continuous variables may be used for conducting signals from one station to the other, and that wireless transmission methods may be employed.

While apparatus utilizing rotary movements and angular accelerations has been shown, it will be understood that instruments employing linear movements and accelerations follow analogous laws and that their use is within the scope and spirit of the invention.

Where elements have been shown conventionally by block diagrams, it will be understood that any well known form of these components may be used and that men skilled in this art may devise any number of satisfactory variations thereof without additional teaching. Likewise, circuit constants for various components have not been given inasmuch as men skilled in this art also may supply various ones to produce the necessary functions within the scope of the invention and without departing from the spirit thereof.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. A follow-up system receiver comprising, a follow-up element which assumes a position corresponding to the value of a property of a transmitted signal, the value of said property being determined by a directing member at a transmitting station, linear electromagnetic means for driving said follow-up element, means for energizing said electromagnetic means with current proportional to the second time derivative of said value for primarily positioning said follow-up member, secondary means for energizing said electromagnetic means to cause said follow-up element to assume the same initial relative velocity and position as said directing element, and means for applying in series with said electromagnetic means a voltage proportional to the first time derivative of said value and of such magnitude and polarity as to balance out the E. M. F. generated in said electromagnetic means.

2. A follow-up system receiver comprising, a follow-up element which assumes a position corresponding to the value of a property of a transmitted signal, the value of said property being determined by a directing member at a transmitting station, a linear electromagnetic movement for driving said follow-up element, vacuum tube amplifier means for energizing said electromagnetic means, a differentiating network for controlling said amplifier in accordance with the second time derivative of the value of said property of said signal for effecting primary positioning of said follow-up member, means for further controlling said amplifier in accordance with the position of said directing element for causing said follow-up element to assume the same initial relative position and velocity as said directing element, circuit means for obtaining a voltage proportional to the first time derivative of said property of said signal, and connection means for supplying said voltage to said amplifier in such polarity and of such value to balance out the E. M. F. generated in said electro-magnetic movement.

3. A follow-up system receiver comprising, a follow-up element movably mounted for assuming desired positions which are linearly related to the value of an electrical variable of an incoming signal, said follow-up element having mass and being so movably mounted that frictional forces are unimportant relative to inertia forces, means for generating an electrical current proportional to the second time derivative of the electrical variable of said signal, linear electromagnetic driving means for generating a force proportional to said current when energized thereby for driving said follow-up element to move with an acceleration equal to said force divided by the mass of said follow-up element, said generating means being proportioned for said force to have a value such that said acceleration is equal to the second time derivative of the said desired position of said follow-up element in its movements, and further means for generating a current to be supplied to said electromagnetic driving means when the desired position of said follow-up element as determined by the incoming signal differs from its actual position for urging said follow-up element to such desired position when differing therefrom.

4. A follow-up system receiver comprising, a follow-up element movably mounted for assuming desired positions which are linearly related to the value of the frequency of an incoming signal voltage, said follow-up element having mass and being so movably mounted that frictional forces are unimportant relative to inertia forces, means for generating an electrical current proportional to the second time derivative of the frequency of said voltage signal, linear electromagnetic driving means for generating a force proportional to said current when energized thereby for driving said follow-up element to move with an acceleration equal to said force divided by the mass of said follow-up element, said generating means being proportioned for said force to have a value such that said acceleration is equal to the second time derivative of the said desired position of said follow-up element in its movements, and further means for generating a current to be supplied to said electromagnetic driving means when the desired position of said follow-up element as determined by the incoming signal differs from its actual position for urging said follow-up element to such desired position when differing therefrom.

5. A follow-up system receiver comprising, a follow-up element movably mounted for assuming desired positions which are linearly related to the value of an electrical variable of an incoming signal, said follow-up element having mass and being so movably mounted that frictional forces are unimportant relative to inertia forces, an amplifier having high output impedance for generating an electrical current proportional to the second time derivative of the electrical variable of said signal, electromagnetic driving means having low impedance relative to the impedance of said amplifier for generating a force proportional to said current when energized thereby for driving said follow-up element to move with an acceleration equal to said force divided by the mass of said follow-up element, said generating means being proportioned for said force to have a value such that said acceleration is equal to the second time derivative of the said desired position of said follow-up element in its movements, and further means for generating a current to be supplied to said electromagnetic driving means when the desired position of said follow-up element as determined by the incoming signal differs from its actual position for urging said follow-up element to such desired position when differing therefrom.

6. A follow-up system receiver comprising, a follow-up element movably mounted for assuming desired positions which are linearly related to the frequency value of an incoming voltage signal, said follow-up element having mass and being so movably mounted that frictional forces are unimportant relative to inertia forces, means for generating an electrical current proportional to the second time derivative of the frequency of said voltage signal, linear electromagnetic driving means comprising a moving coil and a magnetic field means for generating a force proportional to said current when energized thereby for driving said follow-up element to move with an acceleration equal to said force divided by the mass of said follow-up element, said generating means being proportioned for said force to have a value that said acceleration is equal to the second time derivative of the said desired position of said follow-up element in its movements, a frequency responsive network to which said incoming signal is to be supplied, means controlled by said follow-up element for determining the frequency condition of said network, further means for generating a current proportional to the difference between the frequency of said incoming signal and the frequency corresponding to the condition of said network, and connection means for supplying the current of said further means to said electromagnetic driving means whereby said follow-up element is urged to such desired position when differing therefrom.

7. A follow-up system receiver comprising, a follow-up element movably mounted for assuming desired positions which are linearly related to the frequency value of an incoming voltage signal, said follow-up element having mass and being so movably mounted that frictional forces are unimportant relative to inertia forces, means for generating an electrical current proportional to the second time derivative of the frequency of said voltage signal, linear electromagnetic driving means comprising a moving coil and a magnetic field means for generating a force proportional to said current when energized thereby for driving said follow-up element to move with an acceleration equal to said force divided by the mass of said follow-up element, said generating means being proportioned for said force to have a value that said acceleration is equal to the second time derivative of the said desired position of said follow-up element in its movements, a frequency responsive network to which said incoming signal is to be supplied, means controlled by said follow-up element for determining the frequency condition of said network, and further means for generating a current proportional to the difference between the frequency of said incoming signal and the frequency corresponding to the condition of said network, connection means for supplying the current of said further means to said electromagnetic driving means whereby said follow-up element is urged to such desired position when differing therefrom, and error rate damping means for further energizing said driving means in accordance with the first time derivative of said frequency difference.

8. A follow-up system receiver comprising, a follow-up element movably mounted for assuming desired positions which are linearly related to the frequency value of an incoming voltage signal, said follow-up element having mass and being so movably mounted that frictional forces are unimportant relative to inertia forces, means for generating an electrical currrent proportional to the second time derivative of the frequency of said voltage signal, linear electromagnetic driving means comprising a moving coil and a magnetic field means for generating a force proportional to said current when energized thereby for driving said follow-up element to move with an acceleration equal to said force divided by the mass of said follow-up element, said generating means being proportioned for said force to have a value that said acceleration is equal to the second time derivative of the said desired position of said follow-up element in its movements, further means for generating a current to be supplied to said electromagnetic driving means when the desired position of said follow-up element as determined by the incoming signal differs from its actual position for urging said follow-up element to such desired position when differing therefrom, and means for generating a current proportional to the first time derivative of said frequency and supplying it to said driving means in such polarity and with such amplitude as to balance out the E. M. F. generated in said driving means.

9. A follow-up system receiver comprising, a follow-up element movably mounted for assuming desired positions which are linearly related to the frequency value of an incoming voltage signal, said follow-up element having mass and being so movably mounted that frictional forces are unimportant relative to inertia forces, a discriminator for converting the variable frequency voltage signal into corresponding variations of a D. C. voltage, means for generating an electrical voltage proportional to the second time derivative of said D. C. voltage, amplification means for producing a current corresponding to said voltage, linear electromagnetic driving means comprising a moving coil and a magnetic field means for generating a force proportional to said current when energized thereby for driving said follow-up element to move with an acceleration equal to said force divided by the mass of said follow-up element, said generating means being proportioned for said force to have a value that said acceleration is equal to the second time derivative of the said desired position of said follow-up element in its movements, a passive frequency sensitive circuit to which said incoming signal is to be supplied and whose tuning frequency is controlled by said follow-up element, and a second discriminator for producing a second D. C. voltage proportional to the instantaneous mismatch between the frequency of the incoming signal and the tuned frequency of said passive circuit and supplying it to said amplifier whereby said electromagnetic driving means urges said follow-up element to such desired position when differing therefrom.

10. A follow-up system receiver comprising, a follow-up element movably mounted for assuming desired positions which are linearly related to the value of an electrical variable of an incoming signal, said follow-up element having mass and being so movably mounted that frictional forces are unimportant relative to inertia forces, means for generating an electrical current proportional to the second time derivative of the electrical variable of said signal, linear electromagnetic driving means for generating a force proportional to said current when energized thereby for driving said follow-up element to move with an acceleration equal to said force divided by the mass of said follow-up element, said generating means being proportioned for said force to have a value such that said acceleration is equal to the second time derivative of the said desired position of said follow-up element in its movements, and further means for holding said follow-up element in positions linearly related to the value of said variable in the absence of said current.

11. A follow-up system receiver comprising, a follow-up element movably mounted for assuming desired positions which are linearly related to the value of an electrical variable of an incoming signal, said follow-up element having mass and being so movably mounted that frictional forces are unimportant relative to inertia forces, means for generating an electrical current proportional to the second time derivative of the electrical variable of said signal, linear electromagnetic driving means for generating a force proportional to said current when energized thereby for driving said follow-up element to move with an acceleration equal to said force divided by the mass of said follow-up element, said generating means being proportioned for said force to have a value such that said acceleration is equal to the second time derivative of the said desired position of said follow-up element in its movements, and further means for generating a current corresponding to the instantaneous mismatch of the desired position of said follow-up element and its actual position to be supplied to said electromagnetic driving means.

12. A follow-up system receiver comprising, a follow-up element movably mounted for assuming desired positions which are linearly related to the value of an electrical variable of an incoming signal, said follow-up element having mass and being so movably mounted that frictional forces are unimportant relative to inertia forces, means for generating an electrical current proportional to the second time derivative of the electrical variable of said signal, linear electromagnetic driving means for generating a force proportional to said current when energized thereby for driving said follow-up element to move with an acceleration equal to said force divided by the mass of said follow-up element, said generating means being proportioned for said force to have a value such that said acceleration is equal to the second time derivative of the said desired position of said follow-up element in its movements, and further means for generating a current linearly proportional to the value of said variable to be supplied to said electromagnetic driving means.

13. A follow-up system receiver comprising, a follow-up element rotatably mounted for assuming desired angular positions which are linearly related to the value of an electrical variable of an incoming signal, said follow-up element having mass and being so movably mounted that frictional forces are unimportant relative to inertia forces, means for generating an electrical current proportional to the second time derivative of the electrical variable of said signal, linear electromagnetic driving means comprising a magnetic field and rotatable coil mounted therein for generating a torque proportional to said current when said coil is energized thereby for driving said follow-up element to move with an angular acceleration equal to said torque divided by the moment of intertia of said follow-up element, said generating means being proportioned for said torque to have a value that said angular acceleration is equal to the second time derivative of the said desired position of said follow-up element in its movements, and further means for generating a current to be supplied to said electromagnetic driving means when the desired position of said follow-up element as determined by the incoming signal differs from its actual position for urging said follow-up element to such desired position when differing therefrom.

14. In a follow-up system, the combination comprising, a directing element movable to different positions, means for generating an electrical signal having an electrical variable linearly related to the position of said directing element, means for receiving said signal, a follow-up element movably mounted at said receiving means for assuming desired positions corresponding directly to the position of said directing element, said desired positions being linearly related to the value of said electrical variable, said follow-up element having mass and being so movably mounted that frictional forces are unimportant relative to inertia forces, means at said receiving means for generating an electrical current proportional to the second time derivative of the electrical variable of said signal, linear electromagnetic driving means for generating a force proportional to said current when energized thereby for driving said follow-up element to move with an acceleration equal to said force divided by the mass of said follow-up element, said generating means being proportioned for said force to have a value such that said acceleration is equal to the second time derivative of the said desired position of said follow-up element in its movements, and further means for generating a current to be supplied to said electromagnetic driving means when the desired position of said follow-up element as determined by the incoming signal differs from its actual position for urging said follow-up element to such desired position when differing therefrom.

ROBERT ADLER.

REFERENCES CITED

The following references are of record in the file of this patent:

UNITED STATES PATENTS

| Number | Name | Date |
|---|---|---|
| 2,088,654 | Hull | Aug. 3, 1937 |
| 2,304,740 | Minton | Dec. 8, 1942 |
| 2,414,430 | Nisbet | Jan. 14, 1947 |
| 2,423,616 | Rath | July 8, 1947 |
| 2,462,095 | Halpert et al. | Feb. 22, 1949 |
| 2,473,401 | Wild | June 14, 1949 |
| 2,480,713 | Cherry | Aug. 30, 1949 |
| 2,511,564 | Callan | June 13, 1950 |
| 2,516,765 | Ferrell | July 25, 1950 |